United States Patent
Sheridan et al.

(10) Patent No.: US 9,816,443 B2
(45) Date of Patent: Nov. 14, 2017

(54) METHOD FOR SETTING A GEAR RATIO OF A FAN DRIVE GEAR SYSTEM OF A GAS TURBINE ENGINE

(71) Applicant: United Technologies Corporation, Farmington, CT (US)

(72) Inventors: William G. Sheridan, Southington, CT (US); Karl L. Hasel, Manchester, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 15/337,171

(22) Filed: Oct. 28, 2016

(65) Prior Publication Data
US 2017/0051677 A1 Feb. 23, 2017

Related U.S. Application Data

(63) Continuation of application No. PCT/US2013/061115, filed on Sep. 23, 2013, which
(Continued)

(51) Int. Cl.
*F01D 1/04* (2006.01)
*F01D 25/16* (2006.01)
(Continued)

(52) U.S. Cl.
CPC .................. *F02C 7/36* (2013.01); *F01D 1/04* (2013.01); *F01D 9/041* (2013.01); *F01D 25/162* (2013.01);
(Continued)

(58) Field of Classification Search
CPC ..... F01D 1/00; F01D 1/02; F01D 1/04; F01D 25/28; F01D 25/162; F02C 3/04;
(Continued)

(56) References Cited

U.S. PATENT DOCUMENTS

| 2,154,532 A | 4/1939 | Ryder |
| 3,287,906 A | 11/1966 | McCormick |

(Continued)

FOREIGN PATENT DOCUMENTS

| EP | 1712738 | 10/2006 |
| EP | 2199568 | 6/2010 |

(Continued)

OTHER PUBLICATIONS

Internet print-out of "http://airinsight.com/2011/11/09/comparing-the-new-technology-narrow-body-engines-gtf-vs-leap-maintenance-costs/", published Nov. 9, 2011.*

(Continued)

*Primary Examiner* — Christopher Verdier
*Assistant Examiner* — Christopher R Legendre
(74) *Attorney, Agent, or Firm* — Carlson, Gaskey & Olds, P.C.

(57) ABSTRACT

A gas turbine engine includes an engine centerline longitudinal axis and a fan section including a fan with fan blades and rotatable about the engine centerline longitudinal axis. A low corrected fan tip speed less than about 1400 ft/sec and the low corrected fan tip speed is an actual fan tip speed determined at an ambient temperature divided by $[(Tram\ °R)/(518.7\ °R)]^{0.5}$, where T represents the ambient temperature in degrees Rankine. A bypass ratio greater than about 11 and a speed reduction device having a gear system with a gear ratio. A low and high pressure turbine in communication with a first and second shaft, respectively. The first and second shafts are concentric and mounted via at least one of the bearing systems for rotation about the engine centerline longitudinal axis and the first shaft is in communication with the fan through the speed reduction device and the low pressure turbine includes four stages.

22 Claims, 3 Drawing Sheets

Related U.S. Application Data is a continuation of application No. 13/758,075, filed on Feb. 4, 2013, now Pat. No. 8,753,065.

(60) Provisional application No. 61/706,212, filed on Sep. 27, 2012.

(51) Int. Cl.

| | |
|---|---|
| *F02C 3/04* | (2006.01) |
| *F02C 7/36* | (2006.01) |
| *F02K 3/06* | (2006.01) |
| *F02C 7/00* | (2006.01) |
| *F01D 9/04* | (2006.01) |

(52) U.S. Cl.
CPC ............... *F02C 3/04* (2013.01); *F02C 7/00* (2013.01); *F02K 3/06* (2013.01); *F05D 2220/36* (2013.01); *F05D 2240/12* (2013.01); *F05D 2240/24* (2013.01); *F05D 2240/50* (2013.01); *F05D 2260/40311* (2013.01)

(58) Field of Classification Search
CPC .... F02C 7/36; F02K 3/06; F05D 2260/40311; F05D 2220/36; F05D 2240/50
See application file for complete search history.

(56) References Cited

U.S. PATENT DOCUMENTS

| | | |
|---|---|---|
| 3,754,484 A | 8/1973 | Roberts |
| 3,892,358 A | 7/1975 | Gisslen |
| 3,956,887 A | 5/1976 | MacDonald |
| 4,130,872 A | 12/1978 | Haloff |
| 4,493,184 A | 1/1985 | Nikkanen et al. |
| 4,827,712 A | 5/1989 | Coplin |
| 4,969,325 A | 11/1990 | Adamson et al. |
| 5,102,379 A | 4/1992 | Pagluica et al. |
| 5,389,048 A | 2/1995 | Carlson |
| 5,433,674 A | 7/1995 | Sheridan et al. |
| 5,447,411 A | 9/1995 | Curley et al. |
| 5,466,198 A | 11/1995 | McKibbin et al. |
| 5,486,553 A | 1/1996 | Deaner et al. |
| 5,524,847 A | 6/1996 | Brodell et al. |
| 5,539,027 A | 7/1996 | Deaner et al. |
| 5,685,797 A | 11/1997 | Barnsby et al. |
| 5,778,659 A | 7/1998 | Duesler et al. |
| 5,857,836 A | 1/1999 | Stickler et al. |
| 5,915,917 A | 6/1999 | Eveker et al. |
| 5,975,841 A | 11/1999 | Lindemuth et al. |
| 6,223,616 B1 | 5/2001 | Sheridan |
| 6,318,070 B1 | 11/2001 | Rey et al. |
| 6,607,165 B1 | 8/2003 | Manteiga et al. |
| 6,672,838 B1 | 1/2004 | Crall et al. |
| 6,732,502 B2* | 5/2004 | Seda ............... F01D 5/03 60/226.1 |
| 6,814,541 B2 | 11/2004 | Evans et al. |
| 6,964,155 B2 | 11/2005 | McCune et al. |
| 6,966,174 B2 | 11/2005 | Paul |
| 7,021,042 B2 | 4/2006 | Law |
| 7,328,580 B2 | 2/2008 | Lee et al. |
| 7,374,403 B2* | 5/2008 | Decker ............... F01D 5/141 416/223 A |
| 7,574,856 B2 | 8/2009 | Mak |
| 7,591,754 B2 | 9/2009 | Duong et al. |
| 7,704,178 B2 | 4/2010 | Sheridan et al. |
| 7,726,113 B2 | 6/2010 | Orlando et al. |
| 7,824,305 B2 | 11/2010 | Duong et al. |
| 7,926,260 B2 | 4/2011 | Sheridan et al. |
| 7,997,868 B1 | 8/2011 | Liang et al. |
| 8,096,753 B2 | 1/2012 | Norris et al. |
| 8,191,352 B2 | 6/2012 | Schilling |
| 8,205,432 B2 | 6/2012 | Sheridan |
| 8,257,024 B1 | 9/2012 | Phillips et al. |
| 8,261,527 B1 | 9/2012 | Stearns et al. |
| 8,337,149 B1 | 12/2012 | Hasel et al. |
| 8,371,812 B2 | 2/2013 | Manteiga |
| 8,448,895 B2* | 5/2013 | Suciu .............. B64D 27/26 244/53 R |
| 8,585,538 B2 | 11/2013 | Sheridan et al. |
| 8,678,743 B1* | 3/2014 | Sheridan ........... F02C 7/36 415/1 |
| 8,695,920 B2 | 4/2014 | Suciu |
| 8,753,065 B2 | 6/2014 | Sheridan et al. |
| 8,753,243 B2 | 6/2014 | McCune et al. |
| 8,807,477 B2* | 8/2014 | Suciu ............... B64D 27/26 244/53 R |
| 8,807,916 B2 | 8/2014 | Sheridan et al. |
| 8,844,265 B2* | 9/2014 | Adams ............. F02C 7/36 415/199.4 |
| 2004/0128978 A1 | 7/2004 | McCune et al. |
| 2004/0255590 A1 | 12/2004 | Rago et al. |
| 2006/0179818 A1 | 8/2006 | Merchant |
| 2008/0003096 A1 | 1/2008 | Kohli et al. |
| 2008/0056888 A1* | 3/2008 | Somanath ........... F01D 5/147 415/142 |
| 2009/0056343 A1 | 3/2009 | Suciu et al. |
| 2010/0132374 A1 | 6/2010 | Manteiga |
| 2010/0148396 A1 | 6/2010 | Xie et al. |
| 2010/0154384 A1 | 6/2010 | Schilling |
| 2010/0162683 A1* | 7/2010 | Grabowski ........... F02C 7/36 60/226.3 |
| 2010/0331139 A1 | 12/2010 | McCune |
| 2011/0206498 A1 | 8/2011 | McCooey |
| 2011/0293423 A1 | 12/2011 | Bunker et al. |
| 2012/0124964 A1 | 5/2012 | Hasel et al. |
| 2012/0198815 A1 | 8/2012 | Suciu |
| 2012/0198816 A1* | 8/2012 | Suciu ............. B64D 27/26 60/226.3 |
| 2012/0198817 A1 | 8/2012 | Suciu et al. |
| 2012/0213628 A1 | 8/2012 | McCune et al. |
| 2012/0233982 A1* | 9/2012 | Suciu ............. B64D 27/26 60/226.3 |
| 2012/0237334 A1 | 9/2012 | McCune et al. |
| 2012/0315130 A1 | 12/2012 | Hasel et al. |
| 2013/0004297 A1 | 1/2013 | Sheridan |
| 2013/0023378 A1 | 1/2013 | McCune et al. |
| 2013/0132374 A1 | 5/2013 | Olstad et al. |
| 2013/0192256 A1* | 8/2013 | Suciu ............. F02K 3/06 60/796 |
| 2014/0083107 A1 | 3/2014 | Sheridan et al. |
| 2014/0198817 A1 | 7/2014 | Johnson et al. |
| 2015/0096303 A1 | 4/2015 | Schwarz et al. |
| 2017/0051677 A1* | 2/2017 | Sheridan ............ F02C 7/00 |

FOREIGN PATENT DOCUMENTS

| | | |
|---|---|---|
| EP | 2535548 | 6/2012 |
| EP | 2762710 | 8/2014 |
| GB | 1516041 | 6/1978 |
| GB | 2041090 | 9/1980 |
| JP | 2002303147 | 10/2002 |
| WO | 2007038674 | 4/2007 |
| WO | 2014182467 | 11/2014 |

OTHER PUBLICATIONS

Brines, G.L. "The turbofan of tomorrow". Mechanical Engineering: The Journal of the American Society of Mechanical Engineers, 108(8), Aug. 1990, pp. 65-67.*
Jane's Aero-Engines, Issue Seven, Mar. 2000, pp. 510-512.
Performance and Weight Estimates for an Advanced Open Rotor Engine, Eric S. Hendricks and Michael T. Tong, NASA/TM-2012-217710, AIAA-2012-3911, Sep. 2012, pp. 1-13.
Ciepluch et al., "Quiet, Powered-Lift Propulsion," NASA Conference Publication 2077, Nov. 14-15, 1978 (429 pages).
International Search Report and Written Opinion for PCT/US13/61115 dated Apr. 16, 2014.
Partial EP Search Report for Application No. EP 13852366.7 completed on Nov. 28 2014.
Engine Design Studies for a Silent Aircraft. Hall and Crichton. Journal of Turbomachinery. Jul. 2007, vol. 129. pp. 479-487.

(56) References Cited

OTHER PUBLICATIONS

Investigation of Very High Bypass Ratio Engines for Subsonic Transports. Zimbrick and Colehourt. 4549 Journal of Propulsion and Power 6(1990) Jul./Aug., No. 4, Washington, DC US. pp. 490-496.
Aero-engine Design: From State of the Art turbofans Towards Innovative Architectures: Mar. 3-7, 2008. Topic: Geared Fan, by Dr. Gunter Wilfert, MTU Aero Engines, Germany;.
Aero-engine Design: From State of the Art turbofans Towards Innovative Architectures: Mar. 3-7, 2008. Topic: Gas Turb Software, by J. Kurzke.
The PW1000G Pure Power New Engine Concept and Its Impact on MRO. Av Week Engine MRO Forum, Dec. 1, 2010. Jayant Sabnis and Christian Winkler.
EP Search Report for Application No. 14153772.0 completed on May 28, 2014.
Full EP Search Report for Application No. EP 13852366.7 completed on Apr. 10, 2015.
Third Party Observations submitted to EPO Jan. 1, 2015. for EP Application No. 13852366.7 (first set).
Third Party Observations submitted to EPO Apr. 8, 2015 for EP Application No. 13852366.7 (second set).
Coy, Peter, "The Little Gear That Could Reshape the Jet Engine", Bloomberg Business, Oct. 15, 2015, pp. 1-4 [accessed on Nov. 10, 2015 at http://www.bloomberg.com/news/articles/2015-10-15/pratt-s-purepower-gff-jet-engine-innovation-took-almost-30-years].
Multi-Objective Optimization of Turbofan Design Parameters for an Advanced, Single-Aisle Transport. Jeffrey J. Berton and Mark D. Guynn.10th AIAA Aviation Technology, Integration and Operations Conference, Sep. 13-15 2010, Fort Worth, Texas. pp. 1-17.
Gearing Up for the GTF Article. Aircraft Technology Engineering and Maintenance—Issue 105. 2010 pp. 86, 88,90,92,93-95.
International Preliminary Report on Patentability for International application No. PCT/US2013/061115. Dated Aug. 13, 2015.
Jane's Aero Engines, Issue Seven, Edited by Bill Gunston, Jane's Information Group Inc. Alexandria, Virginia, 2000, pp. 1-67.
Warwick, G. "Civil Engines: Pratt & Whitney Gears up for the Future with GTF", Flight International, Nov. 2007, accessed on Jul. 17, 2015 at http://www.flightglobal.com/news/articles/civil-engines-pratt-amp-whitney-gears-up-for-the-future-with-gff.
Boggia, S. and Rud K., "intercooled Recuperated Gas Turbine Engine Concept", AIAA 2005-4192, 41st AIAA/ASME/SAE/ASEE/Joint Propulsion Conference & Exhibit, Jul. 10-13, 2005, Tucson, Arizona, pp. 1-11.
McMillian, A. (2008) Material development for fan blade containment casing. Abstract. p. 1. Conference on Engineering and Physics: Synergy for Success 2006. Journal of Physics: Conference Series vol. 105. London, UK. Oct. 5, 2006.
Kurzke, J. (2009). Fundamental differences between conventional and geared turbofans. Proceedings of ASME Turbo Expo: Power for Land, Sea, and Air. 2009, Orlando, Florida. pp. 145-153.
Agarwal, B.D and Broutman, L.J. (1990). Analysis and performance of fiber composites, 2nd Edition. John Wiley & Sons, Inc. New York: New York. pp. 1-30, 50-51, 56-58, 60-61, 64-71, 87-89, 32432-9, 436-437.
Carney, K., Pereira, M. Revilock, and Matheny, P. (2003). Jet engine fan blade containment using two alternate geometries. 4th European LS-DYNA Users Conference. pp. 1-10.
Brines, G.L. (1990). The turbofan of tomorrow. Mechanical Engineering: The Journal of the American Society of Mechanical Engineers,108(8), 65-67.
Faghri, A. (1995). Heat pipe and science technology. Washington, D.C: Taylor & Francis. pp. 1-60.
Hess, C. (1998). Pratt & Whitney develops geared turbofan. Flug Revue 43(7). Oct. 1998.
Grady, J.E., Weir, D.S., Lamoureux, M.C., and Martinez, M.M. (2007). Engine noise research in NASA's quiet aircraft technology project. Papers from the International Symposium on Air Breathing Engines (ISABE). 2007.
Griffiths, B. (2005). Composite fan blade containment case. Modem Machine Shop. Retrieved from: http://www.mmsonline.com/articles/composite-fan-blade-containment-case pp. 1-4.
Hall, C.A. and Crichton, D. (2007). Engine design studies for a silent aircraft. Journal of Turbomachinery, 129, 479-487.
Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37 (20), 1821-1837.
Brennan, P.J. and Kroliczek, E.J. (1979). Heat pipe design handbook. Prepared for National Aeronautics and Space Administration by B & K Engineering, Inc. Jun. 1979. pp. 1-348.
Horikoshi, S. and Serpone, N. (2013). Introduction to nanoparticles. Microwaves in nanoparticle synthesis. Wiley-VCH Verlag GmbH & Co. KGaA. pp. 1-24.
Kerrebrock, J.L. (1977). Aircraft engines and gas turbines. Cambridge, MA: The MIT Press. p. 11.
Xie, M. (2008). Intelligent engine systems: Smart case system. NASA/CR-2008-215233. pp. 1-31.
Knip, Jr., G. (1987). Analysis of an advanced technology subsonic turbofan incorporating revolutionary materials. NASA Technical Memorandum. May 1987. pp. 1-23.
Willis, W.S. (1979). Quiet clean short-haul experimental engine (QCSEE) final report NASA/CR-159473 pp. 1-289.
Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.
Kollar, L.P. and Springer, G.S. (2003). Mechanics of composite structures. Cambridge, UK: Cambridge University Press. p. 465.
Ramsden, J.M. (Ed). (1978). The new European airliner. Flight International, 113(3590). Jan. 1978. pp. 39-43.
Langston, L. and Faghri, A. Heat pipe turbine vane cooling. Prepared for Advanced Turbine Systems Annual Program Review. Morgantown, West Virginia. Oct. 17-19, 1995. pp. 3-9.
Oates, G.C. (Ed). (1989). Aircraft propulsion systems and technology and design. Washington, D.C.: American Institute of Aeronautics, Inc. pp. 341-344.
Lau, K. Gu, C., and Hui, D. (2005). A critical review on nanotube and nanotube/nanoclay related polymer composite materials. Composites: Part B 37(2006) 425-436.
Shorter Oxford English dictionary, 6th Edition. (2007). vol. 2, N-Z. p. 1888.
Lynwander, P. (1983). Gear drive systems: Design and application. New York, New York: Marcel Dekker, Inc. pp. 145, 355-358.
Sweetman, B. and Sutton, O. (1998). Pratt & Whitney's surprise leap. Interavia Business & Technology, 53.621, p. 25.
Mattingly, J.D. (1996). Elements of gas turbine propulsion. New York, New York: McGraw-Hill, Inc. pp. 8-15.
Pyrograf-III Carbon Nanofiber. Product guide. Retrieved Dec. 1, 2015 from: http://pyrografproducts.com/Merchant5/merchant.mvc?Screen=cp_nanofiber.
Nanocor Technical Data for Epoxy Nanocomposites using Nanomer 1.30E Nanoclay. Nnacor, Inc. Oct. 2004.
Ratna, D. (2009). Handbook of thermoset resins. Shawbury, UK: iSmithers. pp. 187-216.
Wendus, B.E., Stark, D.F., Holler, R.P., and Funkhouser, M.E. (2003). Follow-on technology requirement study for advanced subsonic transport. NASA/CR-2003-212467. pp. 1-37.
Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.pp. 1-7.
Merriam-Webster's collegiate dictionary, 11th Ed. (2009). p. 824.
Merriam-Webster's collegiate dictionary, 10th Ed. (2001). pp. 1125-1126.
Whitaker, R. (1982). ALF 502: plugging the turbofan gap. Flight International, p. 237-241, Jan. 30, 1982.
Hughes, C. (2010). Geared turbofan technology. NASA Environmentally Responsible Aviation Project. Green Aviation Summit. NASA Ames Research Center. Sep. 8-9, 2010. pp. 1-8.

(56) References Cited

OTHER PUBLICATIONS

Gliebe, P.R. and Janardan, B.A. (2003). Ultra-high bypass engine aeroacoustic study. NASA/CR-2003-21252. GE Aircraft Engines, Cincinnati, Ohio. Oct. 2003. pp. 1-103.
Moxon, J. How to save fuel in tomorrow's engines. Flight International. Jul. 30, 1983. 3873(124). pp. 272-273.
File History for U.S. Appl. No. 12/131,876.
Cusick, M. (1981). Avco Lycoming's ALF 502 high bypass fan engine. Society of Automotive Engineers, inc. Business Aircraft Meeting & Exposition. Wichita, Kansas. Apr. 7-10, 1981. pp. 1-9.
Fledderjohn, K.R. (1983). The TFE731-5: Evolution of a decade of business jet service. SAE Technical Paper Series. Business Aircraft Meeting & Exposition. Wichita, Kansas. Apr. 12-15, 1983. pp. 1-12.
Dickey, T.A. and Dobak, E.R. (1972). The evolution and development status of ALF 502 turbofan engine. National Aerospace Engineering and Manufacturing Meeting. San Diego, California. Oct. 2-5, 1972. pp. 1-12.
Gunston, B. (Ed.) (2000). Jane's aero-engines, Issue seven. Coulsdon, Surrey, UK: Jane's Information Group Limited. pp. 510-512.
Ivchenko-Progress D-436. Jane's Aero-engines, Aero-engines—Turbofan. Feb. 8, 2012.
Ivchenko-Progress AI-727M. Jane's Aero-engines, Aero-engines—Turbofan. Nov. 27, 2011.
Ivchenko-Progress D-727. Jane's Aero-engines, Aero-engines—Turbofan. Feb. 7, 2007.
Turbomeca Aubisque. Jane's Aero-engines, Aero-engines—Turbofan. Nov. 2, 2009.
Aviadvigatel D-110. Jane's Aero-engines, Aero-engines—Turbofan. Jun. 1, 2010.
Rolls-Royce M45H. Jane's Aero-engines, Aero-engines—Turbofan. Feb. 24, 2010.
Honeywell LF502. Jane's Aero-engines, Aero-engines—Turbofan. Feb. 9, 2012.
Honeywell LF507. Jane's Aero-engines, Aero-engines—Turbofan. Feb. 9, 2012.
Honeywell TFE731. Jane's Aero-engines, Aero-engines—Turbofan. Jul. 18, 2012.
NASA Conference Publication. Quiet, powered-lift propulsion. Cleveland, Ohio. Nov. 14-15, 1978. pp. 1-420.
"Civil Turbojet/Turbofan Specifications", Jet Engine Specification Database (Apr. 3, 2005).
Kandebo, S.W. (1993). Geared-turbofan engine design targets cost, complexity. Aviation Week & Space Technology, 148(8). Start p. 32.
Hendricks, E.S. And Tong, M.T. (2012). Performance and weight estimates for an advanced open rotor engine. NASA/TM-2012-217710. pp. 1-13.
Guynn, M. D., Berton, J.J., Fisher, K. L., Haller, W.J., Tong, M. T., and Thurman, D.R. (2011). Refined exploration of turbofan design options for an advanced single-aisle transport. NASA/TM-2011-216883. pp. 1-27.
Zalud, T. (1998). Gears put a new spin on turbofan performance. Machine Design, 70(20), p. 104.
Kurzke, J. (2008). Preliminary Design, Aero-engine design: From state of the art turbofans towards innovative architectures. pp. 1-72.
Zamboni, G. And Xu, L. (2009). Fan root aerodynamics for large bypass gas turbine engines: Influence on the engine performance and 3D design. Proceedings of ASME Turbo Expo 2009: Power for Land, Sea and Air. Jun. 8-12, 2009, Orlando, Florida, USA. pp. 1-12.
Han, J., Dutta, S., and Ekkad, S.V. (2000). Gas turbine heat transfer and cooling technology. New York, NY: Taylor & Francis. pp. 1-25, 129-157, and 160-249.
Mattingly, J.D. (1996). Elements of gas turbine propulsion. New York, New York: McGraw-Hill, Inc. pp. 1-18, 60-62, 85-87, 95-104, 121-123, 223-234, 242-245, 278-280, 303-309, 323-326, 462-479, 517-520, 563-565, 673-675, 682-685, 697-699, 703-705, 802-805, 862-864, and 923-925.
Declaration of Reza Abhari, Ph.D. In re U.S. Pat. No. 8,844,265. Executed Jun. 28, 2016. pp. 1-91.
Declaration of John Eaton, Ph.D. In re U.S. Pat. No. 8,869,568. Executed Mar. 28, 2016. pp. 1-87.
Decision for Inter Partes Review of U.S. Pat. No. 8,678,743. Claims 1-11. *General Electric Company*, Petitioner v. *United Technologies Corporation*, Patent Owner. Entered date of Dec. 12, 2016.
Extended European Search Report for European Application No. 16168355.2 dated Oct. 17, 2016.
Petition for Inter Partes Review of U.S. Pat. No. 8,753,065. Claims 1-11. *General Electric Company*, Petitioner v. *United Technologies Corporation*, Patent Owner. Filed Jan. 29, 2016.
Declaration of Reza Abhari, Ph.D in connection with the petition for inter partes review for U.S. Pat. No. 8,753,065 (challenged claims 1-11) executed Jan. 12, 2016.
Decision for Inter Partes Review of U.S. Pat. No. 8,753,065. Claims 1-11. *General Electric Company*, Petitioner v. *United Technologies Corporation*, Patent Owner. Entered date of Jul. 12, 2016.
Rauch, D., "Design Study of an Air Pump and Integral Lift Engine ALF-504 Using the Lycoming 502 Core", NASA Report CR-120992, NASA Lewis Research Center, Cleveland, Ohio, 1972, pp. 1-182.
Coy, Peter, "The Little Gear That Could Reshape the Jet Engine", Bloomberg Business, Oct. 15, 2015, pp. 1-4 [accessed on Nov. 10, 2015 at http://www.bloomberg.com/news/articles/2015-10-15/pratt-s-purepower-gtf-jet-engine-innovation-took-almost-30-years].
Read, Bill, "Powerplant Revolution", Aerospace, May 2014, pp. 28-31.
Wendus, et al., "Follow-On Technology Requirement Study for Advanced Subsonic Transport", NASA/CR-2003-212467, Aug. 2003, pp. 1-58.
McGuinn, Jack, "Gearbox Speed Reducer Helps Fan Technology for 'Greener' Jet Fuel Efficiency", Gear Technology, Aug. 2008, pp. 18-22.
Airplane Flying Handbook, FAA-H-8083-3A, U.S. Department of Transportation Federal Aviation Administration, 2004, pp. 1-33.
GE90-115 Analysis; Internet Archived on Mar. 31, 2013 from http://www.airliners.net/aviation-forums/tech_ops/read.main/331769/, pp. 1-4.
Wemming, H., "Validation and Integration of a Rubber Engine Model into an MDO Environment", Linkoping University, Sweden, 2010, pp. 1-90.
Eric Adams, "The World's Hugest Jet Engine is Wider than a 737's Fuselage", Apr. 28, 2016 (www.wired.com/2016/04/worlds-hugest-jet-engine-wider-737s-fuselage/accessed on Apr. 28, 2016).
Joseph E. Shigley and Larry D. Mitchell, "Mechanical Engineering Design", 4th Edition, McGraw-Hill Book Company, New York, 1983.
Davis, D.G.M, "Variable-Pitch Fans", Flight International, No. 3345, vol. 103, Apr. 19, 1973, pp. 615-619.
Decision Institution of Inter Partes Review. General Electric Company., *Petitioner*, v. *United Technologies Corp.*, Patent Owner. IPR2016-00524. Patent 8,753,065. Entered Jul. 10, 2017. pp. 1-35.

\* cited by examiner

METHOD FOR SETTING A GEAR RATIO OF A FAN DRIVE GEAR SYSTEM OF A GAS TURBINE ENGINE

CROSS-REFERENCE TO RELATED APPLICATIONS

This disclosure is a continuation of PCT/US2013/061115 filed on Sep. 23, 2013, which is a continuation of U.S. patent application Ser. No. 13/758,075 filed on Feb. 4, 2013, now U.S. Pat. No. 8,753,065 granted on Jun. 17, 2014, which claims priority to U.S. Provisional Patent Application No. 61/706,212 filed on Sep. 27, 2012.

BACKGROUND

This disclosure relates to a gas turbine engine, and more particularly to a method for setting a gear ratio of a fan drive gear system of a gas turbine engine.

A gas turbine engine may include a fan section, a compressor section, a combustor section, and a turbine section. Air entering the compressor section is compressed and delivered into the combustor section where it is mixed with fuel and ignited to generate a high-speed exhaust gas flow. The high-speed exhaust gas flow expands through the turbine section to drive the compressor and the fan section. Among other variations, the compressor section can include low and high pressure compressors, and the turbine section can include low and high pressure turbines.

Typically, a high pressure turbine drives a high pressure compressor through an outer shaft to form a high spool, and a low pressure turbine drives a low pressure compressor through an inner shaft to form a low spool. The fan section may also be driven by the inner shaft. A direct drive gas turbine engine may include a fan section driven by the low spool such that a low pressure compressor, low pressure turbine, and fan section rotate at a common speed in a common direction.

A speed reduction device, which may be a fan drive gear system or other mechanism, may be utilized to drive the fan section such that the fan section may rotate at a speed different than the turbine section. This allows for an overall increase in propulsive efficiency of the engine. In such engine architectures, a shaft driven by one of the turbine sections provides an input to the speed reduction device that drives the fan section at a reduced speed such that both the turbine section and the fan section can rotate at closer to optimal speeds.

Although gas turbine engines utilizing speed change mechanisms are generally known to be capable of improved propulsive efficiency relative to conventional engines, gas turbine engine manufacturers continue to seek further improvements to engine performance including improvements to thermal, transfer and propulsive efficiencies.

SUMMARY

A gas turbine engine according to an exemplary aspect of the present disclosure includes, among other things, a fan section including a fan rotatable about an axis and a speed reduction device in communication with the fan. The speed reduction device includes a star drive gear system with a star gear ratio of at least 1.5. A fan blade tip speed of the fan is less than 1400 fps.

In a further non-limiting embodiment of the foregoing gas turbine engine, the speed reduction device includes a star gear system gear ratio of at least 2.6.

In a further non-limiting embodiment of either of the foregoing gas turbine engines, the speed reduction device includes a system gear ratio less than or equal to 4.1.

In a further non-limiting embodiment of any of the foregoing gas turbine engines, a bypass ratio is included that is greater than about 6.0.

In a further non-limiting embodiment of any of the foregoing gas turbine engines, the bypass ratio is between about 11.0 and about 22.0.

In a further non-limiting embodiment of any of the foregoing gas turbine engines, the star system includes a sun gear, a plurality of star gears, a ring gear, and a carrier.

In a further non-limiting embodiment of any of the foregoing gas turbine engines, each of the plurality of star gears include at least one bearing.

In a further non-limiting embodiment of any of the foregoing gas turbine engines, the carrier is fixed from rotation.

In a further non-limiting embodiment of any of the foregoing gas turbine engines, a low pressure turbine is mechanically attached to the sun gear.

In a further non-limiting embodiment of any of the foregoing gas turbine engines, a fan section is mechanically attached to the ring gear.

In a further non-limiting embodiment of any of the foregoing gas turbine engines, an input of the speed reduction device is rotatable in a first direction and an output of the speed reduction device is rotatable in a second direction opposite to the first direction.

In a further non-limiting embodiment of any of the foregoing gas turbine engines, a low pressure turbine section is in communication with the speed reduction device, The low pressure turbine section includes at least three stages and no more than four stages.

In a further non-limiting embodiment of any of the foregoing gas turbine engines, the fan blade tip speed of the fan is greater than 1000 fps.

A method of improving performance of a gas turbine engine according to another exemplary aspect of the present disclosure includes, among other things, determining fan tip speed boundary conditions for at least one fan blade of a fan section and determining rotor boundary conditions for a rotor of a low pressure turbine, The stress level utilizes constraints in the rotor of the low pressure turbine and the at least one fan blade to determine if the rotary speed of the fan section and the low pressure turbine will meet a desired number of operating cycles.

In a further non-limiting embodiment of the foregoing method, a speed reduction device connects the fan section and the low pressure turbine and includes a star gear ratio of at least about 1.5 and no more than about 4.1.

In a further non-limiting embodiment of either of the foregoing methods, a fan pressure ratio is below 1.7.

In a further non-limiting embodiment of any of the foregoing methods, a fan pressure ratio is below 1.48.

In a further non-limiting embodiment of any of the foregoing methods, a bypass ratio is between about 11 and about 22.

In a further non-limiting embodiment of any of the foregoing methods, a fan blade tip speed of the at least one fan blade is less than 1400 fps.

In a further non-limiting embodiment of any of the foregoing methods, if a stress level in the rotor or the at least one fan blade is too high to meet a desired number of operating cycles, a gear ratio of a gear reduction device is lowered and the number of stages of the low pressure turbine is increased.

In a further non-limiting embodiment of any of the foregoing methods, if a stress level in the rotor or the at least one fan blade is too high to meet a desired number of operating cycles, a gear ratio of a gear reduction device is lowered and an annular area of the low pressure turbine is increased.

The various features and advantages of this disclosure will become apparent to those skilled in the art from the following detailed description. The drawings that accompany the detailed description can be briefly described as follows.

DETAILED DESCRIPTION

Figure 1:
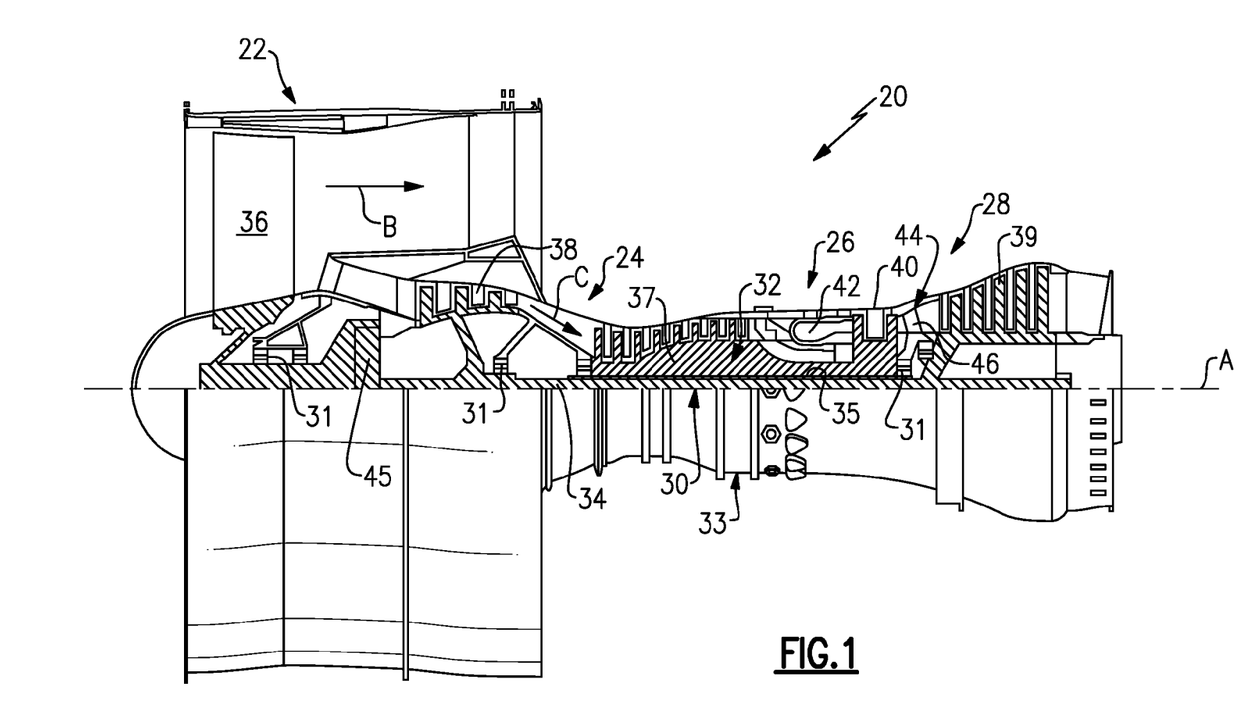
FIG. 1 illustrates a schematic, cross-sectional view of an example gas turbine engine.

FIG. 1 schematically illustrates a gas turbine engine 20. The exemplary gas turbine engine 20 is a two-spool turbofan engine that generally incorporates a fan section 22, a compressor section 24, a combustor section 26 and a turbine section 28. Alternative engines might include an augmentor section (not shown) among other systems or features. The fan section 22 drives air along a bypass flow path B, while the compressor section 24 drives air along a core flow path C for compression and communication into the combustor section 26. The hot combustion gases generated in the combustor section 26 are expanded through the turbine section 28. Although depicted as a two-spool turbofan gas turbine engine in the disclosed non-limiting embodiment, it should be understood that the concepts described herein are not limited to two-spool turbofan engines and these teachings could extend to other types of engines, including but not limited to, three-spool engine architectures.

The exemplary gas turbine engine 20 generally includes a low speed spool 30 and a high speed spool 32 mounted for rotation about an engine centerline longitudinal axis A. The low speed spool 30 and the high speed spool 32 may be mounted relative to an engine static structure 33 via several bearing systems 31. It should be understood that other bearing systems 31 may alternatively or additionally be provided, and the location of bearing systems 31 may be varied as appropriate to the application.

The low speed spool 30 generally includes an inner shaft 34 that interconnects a fan 36, a low pressure compressor 38 and a low pressure turbine 39. The inner shaft 34 can be connected to the fan 36 through a speed change mechanism, which in exemplary gas turbine engine 20 is illustrated as a geared architecture 45, such as a fan drive gear system 50 (see FIGS. 2 and 3). The speed change mechanism drives the fan 36 at a lower speed than the low speed spool 30. The high speed spool 32 includes an outer shaft 35 that interconnects a high pressure compressor 37 and a high pressure turbine 40. In this embodiment, the inner shaft 34 and the outer shaft 35 are supported at various axial locations by bearing systems 31 positioned within the engine static structure 33.

A combustor 42 is arranged in exemplary gas turbine 20 between the high pressure compressor 37 and the high pressure turbine 40. A mid-turbine frame 44 may be arranged generally between the high pressure turbine 40 and the low pressure turbine 39. The mid-turbine frame 44 can support one or more bearing systems 31 of the turbine section 28. The mid-turbine frame 44 may include one or more airfoils 46 that extend within the core flow path C. It will be appreciated that each of the positions of the fan section 22, compressor section 24, combustor section 26, turbine section 28, and fan drive gear system 50 may be varied. For example, gear system 50 may be located aft of combustor section 26 or even aft of turbine section 28, and fan section 22 may be positioned forward or aft of the location of gear system 50.

The inner shaft 34 and the outer shaft 35 are concentric and rotate via the bearing systems 31 about the engine centerline longitudinal axis A, which is co-linear with their longitudinal axes. The core airflow is compressed by the low pressure compressor 38 and the high pressure compressor 37, is mixed with fuel and burned in the combustor 42, and is then expanded over the high pressure turbine 40 and the low pressure turbine 39. The high pressure turbine 40 and the low pressure turbine 39 rotationally drive the respective high speed spool 32 and the low speed spool 30 in response to the expansion.

In a non-limiting embodiment, the gas turbine engine 20 is a high-bypass geared aircraft engine. In a further example, the gas turbine engine 20 bypass ratio is greater than about six (6:1). The geared architecture 45 can include an epicyclic gear train, such as a planetary gear system, a star gear system, or other gear system. The geared architecture 45 enables operation of the low speed spool 30 at higher speeds, which can enable an increase in the operational efficiency of the low pressure compressor 38 and low pressure turbine 39, and render increased pressure in a fewer number of stages.

The pressure ratio of the low pressure turbine 39 can be pressure measured prior to the inlet of the low pressure turbine 39 as related to the pressure at the outlet of the low pressure turbine 39 and prior to an exhaust nozzle of the gas turbine engine 20. In one non-limiting embodiment, the bypass ratio of the gas turbine engine 20 is greater than about ten (10:1), the fan diameter is significantly larger than that of the low pressure compressor 38, and the low pressure turbine 39 has a pressure ratio that is greater than about five (5:1). In another non-limiting embodiment, the bypass ratio is greater than 11 and less than 22, or greater than 13 and less than 20. It should be understood, however, that the above parameters are only exemplary of a geared architecture engine or other engine using a speed change mechanism, and that the present disclosure is applicable to other gas turbine engines, including direct drive turbofans. In one non-limiting embodiment, the low pressure turbine 39 includes at least one stage and no more than eight stages, or at least three stages and no more than six stages. In another non-limiting embodiment, the low pressure turbine 39 includes at least three stages and no more than four stages.

In this embodiment of the exemplary gas turbine engine 20, a significant amount of thrust is provided by the bypass flow path B due to the high bypass ratio. The fan section 22 of the gas turbine engine 20 is designed for a particular flight condition—typically cruise at about 0.8 Mach and about 35,000 feet. This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example gas turbine engine 20 is less than 1.45. In another non-limiting embodiment of the example gas turbine engine 20, the Fan Pressure Ratio is less than 1.38 and greater than 1.25. In another non-limiting embodiment, the fan pressure ratio is less than 1.48. In another non-limiting embodiment, the fan pressure ratio is less than 1.52. In another non-limiting embodiment, the fan pressure ratio is less than 1.7. Low Corrected Fan Tip Speed is the actual fan tip speed divided by an industry standard temperature correction of $[(Tram\ °R)/(518.7°\ R)]^{0.5}$, where T represents the ambient temperature in degrees Rankine. The Low Corrected Fan Tip Speed according to one non-limiting embodiment of the example gas turbine engine 20 is less than about 1150 fps (351 m/s). The Low Corrected Fan Tip Speed according to another non-limiting embodiment of the example gas turbine engine 20 is less than about 1400 fps (427 m/s). The Low Corrected Fan Tip Speed according to another non-limiting embodiment of the example gas turbine engine 20 is greater than about 1000 fps (305 m/s).

Figure 2:
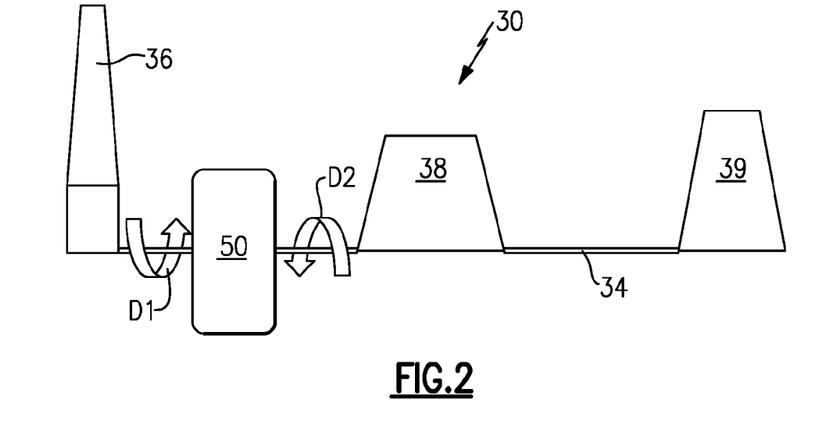
FIG. 2 illustrates a schematic view of one configuration of a low speed spool that can be incorporated into a gas turbine engine.

FIG. 2 schematically illustrates the low speed spool 30 of the gas turbine engine 20. The low speed spool 30 includes the fan 36, the low pressure compressor 38, and the low pressure turbine 39. The inner shaft 34 interconnects the fan 36, the low pressure compressor 38, and the low pressure turbine 39. The inner shaft 34 is connected to the fan 36 through the fan drive gear system 50. In this embodiment, the fan drive gear system 50 provides for counter-rotation of the low pressure turbine 39 and the fan 36. For example, the fan 36 rotates in a first direction D1, whereas the low pressure turbine 39 rotates in a second direction D2 that is opposite of the first direction D1.

Figure 3:
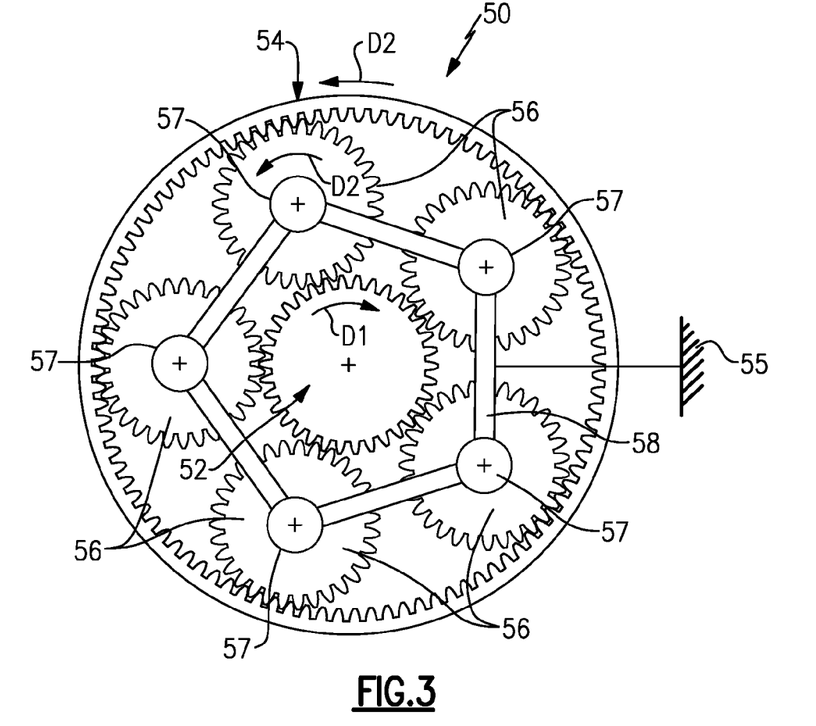
FIG. 3 illustrates a fan drive gear system that can be incorporated into a gas turbine engine.
Figure 4:
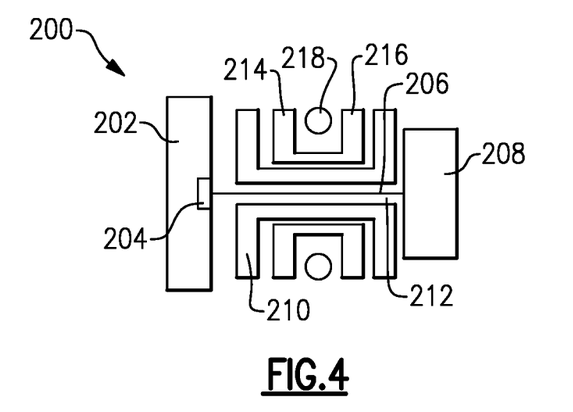
Figure 5:
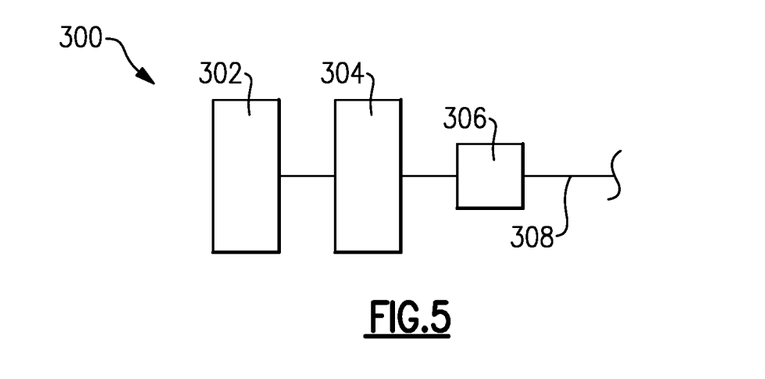

FIG. 3 illustrates one example embodiment of the fan drive gear system 50 incorporated into the gas turbine engine 20 to provide for counter-rotation of the fan 36 and the low pressure turbine 39. In this embodiment, the fan drive gear system 50 includes a star gear system with a sun gear 52, a ring gear 54 disposed about the sun gear 52, and a plurality of star gears 56 having journal bearings 57 positioned between the sun gear 52 and the ring gear 54. A fixed carrier 58 carries and is attached to each of the star gears 56. In this embodiment, the fixed carrier 58 does not rotate and is connected to a grounded structure 55 of the gas turbine engine 20.

The sun gear 52 receives an input from the low pressure turbine 39 (see FIG. 2) and rotates in the first direction D1 thereby turning the plurality of star gears 56 in a second direction D2 that is opposite of the first direction D1. Movement of the plurality of star gears 56 is transmitted to the ring gear 54 which rotates in the second direction D2 opposite from the first direction D1 of the sun gear 52. The ring gear 54 is connected to the fan 36 for rotating the fan 36 (see FIG. 2) in the second direction D2.

A star system gear ratio of the fan drive gear system 50 is determined by measuring a diameter of the ring gear 54 and dividing that diameter by a diameter of the sun gear 52. In one embodiment, the star system gear ratio of the geared architecture 45 is between 1.5 and 4.1. In another embodiment, the system gear ratio of the fan drive gear system 50 is between 2.6 and 4.1. When the star system gear ratio is below 1.5, the sun gear 52 is relatively much larger than the star gears 56. This size differential reduces the load the star gears 56 are capable of carrying because of the reduction in size of the star gear journal bearings 57. When the star system gear ratio is above 4.1, the sun gear 52 may be much smaller than the star gears 56. This size differential increases the size of the star gear 56 journal bearings 57 but reduces the load the sun gear 52 is capable of carrying because of its reduced size and number of teeth. Alternatively, roller bearings could be used in place of journal bearings 57.

Improving performance of the gas turbine engine 20 begins by determining fan tip speed boundary conditions for at least one fan blade of the fan 36 to define the speed of the tip of the fan blade. The maximum fan diameter is determined based on the projected fuel burn derived from balancing engine efficiency, mass of air through the bypass flow path B, and engine weight increase due to the size of the fan blades.

Boundary conditions are then determined for the rotor of each stage of the low pressure turbine 39 to define the speed of the rotor tip and to define the size of the rotor and the number of stages in the low pressure turbine 39 based on the efficiency of low pressure turbine 39 and the low pressure compressor 38.

Constraints regarding stress levels in the rotor and the fan blade are utilized to determine if the rotary speed of the fan 36 and the low pressure turbine 39 will meet a desired number of operating life cycles. If the stress levels in the rotor or the fan blade are too high, the gear ratio of the fan drive gear system 50 can be lowered and the number of stages of the low pressure turbine 39 or annular area of the low pressure turbine 39 can be increased.

Although the different non-limiting embodiments are illustrated as having specific components, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should also be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claim should be studied to determine the true scope and content of this disclosure.

What is claimed is:

1. A gas turbine engine comprising:
an engine centerline longitudinal axis;
a fan section including a fan with a plurality of fan blades and rotatable about the engine centerline longitudinal axis, wherein the fan has a low corrected fan tip speed less than 1400 ft/sec, wherein the low corrected fan tip speed is an actual fan tip speed at an ambient temperature divided by $[(Tram\ °R)/(518.7°\ R)]^{0.5}$, where Tram represents the ambient temperature in degrees Rankine;
a bypass ratio greater than 13 and less than 20;
a fan pressure ratio less than 1.48, wherein the fan pressure ratio is measured across a fan blade alone;
a speed reduction device comprising a gear system with a gear ratio of at least 2.6 and less than or equal to 4.1, wherein the gear system is a star gear system with a ring gear, and a sun gear, wherein the gear ratio is determined by measuring a diameter of the ring gear and dividing that diameter by the diameter of the sun gear;
a low pressure turbine in communication with a first shaft;
a high pressure turbine in communication with a second shaft;

wherein the first shaft and second shaft are concentric and mounted via at least one of a plurality of bearing systems for rotation about the engine centerline longitudinal axis, and the first shaft is in communication with the fan through the speed reduction device;

wherein the low pressure turbine includes four stages;

wherein the low pressure turbine includes at least one rotor constrained by a first stress level, at least one of the plurality of fan blades of the fan constrained by a second stress level and having a fan tip speed boundary condition, and the gear ratio is configured such that in operation the at least one of the plurality of fan blades does not exceed the fan tip speed boundary condition or the second stress level, and the at least one low pressure turbine rotor does not exceed the first stress level; and wherein the high pressure turbine includes two stages.

2. The gas turbine engine of claim 1, wherein the fan pressure ratio is less than 1.38.

3. A gas turbine engine comprising:
an engine centerline longitudinal axis;
a fan section including a fan with a plurality of fan blades and rotatable about the engine centerline longitudinal axis, wherein the fan has a low corrected fan tip speed less than 1400 ft/sec, wherein the low corrected fan tip speed is an actual fan tip speed at an ambient temperature divided by $[(Tram\ °R)/(518.7°\ R)]^{0.5}$, where Tram represents the ambient temperature in degrees Rankine;
a bypass ratio greater than 11.0 and less than 22.0;
a fan pressure ratio less than 1.52, wherein the fan pressure ratio is measured across a fan blade alone;
a speed reduction device comprising a gear system, wherein the gear system is a star gear system with a ring gear, a sun gear, and a star gear ratio, and the star gear ratio is determined by measuring a diameter of the ring gear and dividing that diameter by the diameter of the sun gear;
a low pressure turbine in communication with a first shaft; and
a high pressure turbine in communication with a second shaft;
wherein the first shaft and second shaft are concentric and mounted via at least one of a plurality of bearing systems for rotation about the engine centerline longitudinal axis, and the first shaft is in communication with the fan through the speed reduction device;
wherein the low pressure turbine includes four stages;
wherein the low pressure turbine includes at least one rotor constrained by a first stress level, at least one of the plurality of fan blades of the fan constrained by a second stress level and having a fan tip speed boundary condition, and the star gear ratio is configured such that in operation the at least one of the plurality of fan blades does not exceed the fan tip speed boundary condition or the second stress level, and the at least one low pressure turbine rotor does not exceed the first stress level; and
wherein the high pressure turbine includes two stages.

4. The gas turbine engine of claim 3, wherein the low pressure turbine is configured to drive a low pressure compressor.

5. The gas turbine engine of claim 3, further comprising a low pressure compressor including three stages, wherein the low pressure turbine is configured to drive the low pressure compressor.

6. The gas turbine engine of claim 5, further comprising a high pressure compressor including eight stages, wherein the high pressure turbine is configured to drive the high pressure compressor.

7. The gas turbine engine of claim 3, the star gear system further comprising five intermediate gears.

8. The gas turbine engine of claim 7, further comprising a mid-turbine frame arranged between the high pressure turbine and the low pressure turbine, wherein the mid-turbine frame supports at least one of the bearing systems and includes one or more airfoils.

9. The gas turbine engine of claim 3, wherein the low corrected fan tip speed is less than 1150 ft/sec.

10. A gas turbine engine comprising:
an engine centerline longitudinal axis;
a fan section including a fan with a plurality of fan blades and rotatable about the engine centerline longitudinal axis;
a low corrected fan tip speed less than 1150 ft/sec, wherein the low corrected fan tip speed is an actual fan tip speed at an ambient temperature divided by $[(Tram\ °R)/(518.7°\ R)]^{0.5}$, where Tram represents the ambient temperature in degrees Rankine;
a bypass ratio of greater than 11.0 and less than 22.0;
a speed reduction device comprising a gear system with a gear reduction ratio;
a first turbine in communication with a first shaft; and
a second turbine in communication with a second shaft;
wherein the first shaft and second shaft are concentric and mounted via at least one of a plurality of bearing systems for rotation about the engine centerline longitudinal axis, and the first shaft is in communication with the fan through the speed reduction device;
wherein the first turbine includes at least three stages and no more than four stages; and
wherein the first turbine includes at least one rotor constrained by a first stress level, at least one of the plurality of fan blades of the fan constrained by a second stress level and having a fan tip speed boundary condition, and the gear reduction ratio is configured such that in operation the at least one of the plurality of fan blades does not exceed the fan tip speed boundary condition or the second stress level, and the at least one first turbine rotor does not exceed the first stress level.

11. The gas turbine engine of claim 10, wherein the second turbine includes two stages.

12. The gas turbine engine of claim 11, wherein the first turbine includes three stages.

13. The gas turbine engine of claim 11, wherein the gear reduction ratio is less than or equal to 4.1.

14. The gas turbine engine of claim 13, wherein the gear reduction ratio is at least 2.6.

15. The gas turbine engine of claim 14, wherein the gear system is a star gear system with a ring gear, and a sun gear, wherein the gear reduction ratio is determined by measuring a diameter of the ring gear and dividing that diameter by the diameter of the sun gear.

16. The gas turbine engine of claim 14, wherein the first turbine includes four stages.

17. The gas turbine engine of claim 10, wherein the gear system is a star gear system.

18. A gas turbine engine comprising:
an engine centerline longitudinal axis;
a fan section including a fan with a plurality of fan blades and rotatable about the engine centerline longitudinal axis;

a low corrected fan tip speed less than 1400 ft/sec, wherein the low corrected fan tip speed is an actual fan tip speed at an ambient temperature divided by $[(Tram\ °R)/(518.7°\ R)]^{0.5}$, where Tram represents the ambient temperature in degrees Rankine;

a bypass ratio greater than 11 and less than 22;

a speed reduction device comprising a gear system with a gear reduction ratio;

a low pressure turbine in communication with a first shaft; and a high pressure turbine in communication with a second shaft;

wherein the first shaft and second shaft are concentric and mounted via at least one of a plurality of bearing systems for rotation about the engine centerline longitudinal axis, and the first shaft is in communication with the fan through the speed reduction device; and wherein the low pressure turbine includes four stages; and wherein the low pressure turbine includes at least one rotor constrained by a first stress level, at least one of the plurality of fan blades of the fan constrained by a second stress level and having a fan tip speed boundary condition, and the gear reduction ratio is configured such that in operation the at least one of the plurality of fan blades does not exceed the fan tip speed boundary condition or the second stress level, and the at least one low pressure turbine rotor does not exceed the first stress level.

19. The gas turbine engine of claim 18, wherein the high pressure turbine includes two stages.

20. The gas turbine engine of claim 18, wherein the gear reduction ratio is at least 2.6 and less than or equal to 4.1.

21. The gas turbine engine of claim 18, wherein the gear system is a star gear system with a ring gear, and a sun gear, wherein the gear ratio is determined by measuring a diameter of the ring gear and dividing that diameter by the diameter of the sun gear.

22. The gas turbine engine of claim 18, wherein the gear system is a star gear system.

* * * * *